Sept. 23, 1958 W. S. LEWIS ET AL 2,853,671
STEERING CONTROL APPARATUS
Filed Oct. 12, 1955 3 Sheets-Sheet 1

INVENTORS
William S. Lewis
Donald H. Mitchell
By Mueller & Aichele
Attys.

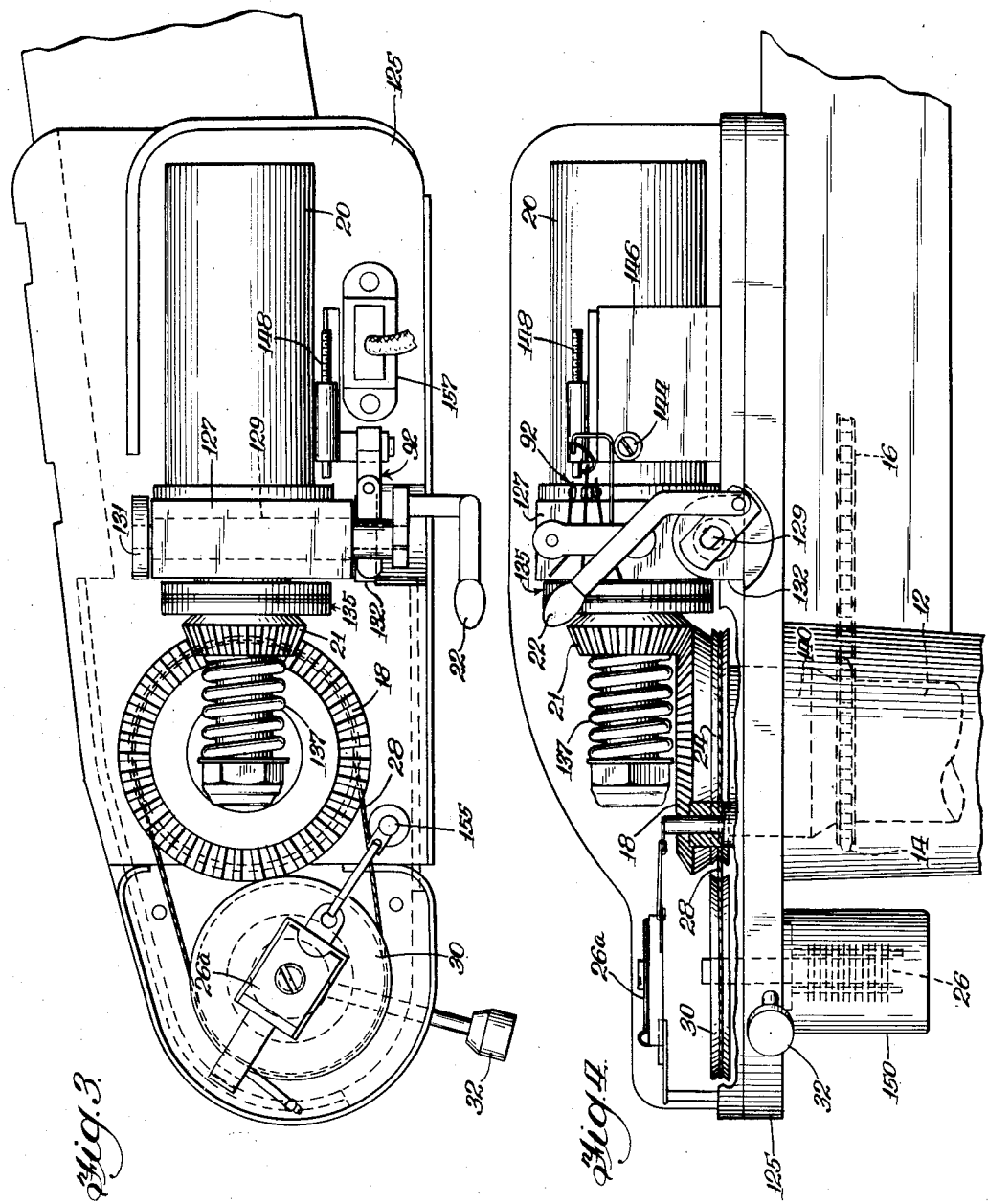

Sept. 23, 1958 W. S. LEWIS ET AL 2,853,671
STEERING CONTROL APPARATUS
Filed Oct. 12, 1955 3 Sheets-Sheet 3

INVENTORS.
William S. Lewis
Donald H. Mitchell
By Mueller & Aichele
Attys

United States Patent Office 2,853,671
Patented Sept. 23, 1958

2,853,671
STEERING CONTROL APPARATUS

William Stone Lewis, Dallas, and Donald H. Mitchell, Mineral Wells, Tex.; said Mitchell assignor to said Lewis Application October 12, 1955, Serial No. 540,042

16 Claims. (Cl. 318—489)

This invention relates to steering control apparatus and more particularly to apparatus of the type for automatically correcting the orientation of an airplane in flight.

In the past various devices for maintaining a plane on course have been provided. However, many of the arrangements furnishing control which is effective and practical have been of complicated and expensive construction and accordingly are not suitable for small private planes. Many such devices are difficult to install and have used mechanism which operated the plane from several control points in a complex manner so that servicing is difficult and reliability of the device is sacrificed. Sometimes costly alteration of the plane or its instruments have been necessary. On the other hand, the prior art systems of simple contruction have not provided a satisfactory method of responding to a change in orientation of the plane to operate the control mechanism in a desired manner for maintaining proper flight and in many cases these orientation indicators have been overly critical so as to diminish the practicality of the whole automatic steering system.

Accordingly, it is an object of this invention to provide automatic orientation controlling apparatus for a mobile craft which is of simple, inexpensive construction, and has low weight and requires a small amount of electrical power for its operation.

Another object is to provide a level and directional control system for a plane which controls the plane from a single point and which may be easily installed therein.

A further object of the invention is to provide automatic steering control apparatus for an airplane which apparatus produces no drag on the plane's controls when inoperative, and which, when operative may be overridden by a pilot operating the plane in an emergency situation or the like.

Still another object of the invention is to provide automatic aileron controlling apparatus which is responsive to the artificial horizon and/or directional gyro of the plane in an improved manner so as to require a minimum of physical and operational change in these instruments while at the same time providing sensitive response to control the plane in accordance with indications of these instruments.

A still further object of the invention is to provide a smoothly functioning automatic plane controlling system which provides desirable operation of a control of the plane according to large or small shifts in orientation of the plane during flight.

A feature of the invention is the provision of plane controlling apparatus including a reversible electric motor engageable with the steering or aileron control of the plane for driving this control in accordance with the frequency of a control signal, which frequency is regulated by a variable inductance or capacitor coupled to the artificial horizon indicating instrument of the plane. The frequency of the control signal may be further regulated by a variable capacitor coupled to the directional gyro indicating instrument of the plane.

Another feature of the invention is the provision of automatic piloting apparatus for an airplane including a reversible electric motor selectively engageable with the aileron control shaft of the plane and in which the motor is coupled to the control shaft through a friction clutch so that severe torque applied to the shaft, as by sudden operation by the pilot of the plane, will override the motor even when it is engaged with the control shaft.

A further feature of the invention is the provision of automatic plane piloting apparatus in which an artificial horizon indicating instrument in the plane includes an inductance or capacitor influencing plate mounted on a movable portion of the instrument to change the frequency of an associated resonant circuit to control the frequency of an oscillator which in turn is adapted to steer the plane according to a shift in its frequency.

Still another feature of the invention is the provision of tuning elements in level and directional indicating instruments of a plane and a further variable capacitor operated by a motor driven steering shaft of the plane; the elements and capacitor form the tuned circuit of an oscillator, deviation from a selected standard frequency of which causes operation of the motor to drive the steering shaft. The further variable capacitor forms a follow up which compensates for changes in resonance of the tuned circuit as the motor drives the shaft in response to a change in the tuning elements in the indicating instruments thereby returning the tuned circuit to the standard frequency and stopping the motor after a shift in frequency caused by variation of an indicating instrument.

Another feature of the invention is the provision of the apparatus described in the preceding paragraph in which the further variable capacitor may be manually adjusted by the pilot of the plane to change the oscillator frequency from its standard thereby maintaining a predetermined deviation from an established course through operation of the automatic control.

Yet another feature of the invention is the provision of automatic plane steering apparatus in which the frequency of an oscillator controls a discriminator circuit which operates relays to drive a reversible motor for steering the plane according to increase or decrease in the oscillator frequency and in which the relays are adapted to apply power to the motor through a regulating system providing an instantaneous high potential at starting of the motor followed by a low but increasing potential so that short operating periods of the motor are terminated at low motor speed and long operating periods are terminated when the potential has increased to furnish high motor speed for optimum control of the plane according to small or large deviations from its course.

Further objects, features and the attending advantages of the invention will be apparent upon consideration of the following description when taken in conjunction with the accompanying drawings in which:

Fig. 3 is a rear elevational view of the motor control mechanism of the invention;

Fig. 4 is a plan view of the mechanism of Fig. 3;

Figures 1, 2:
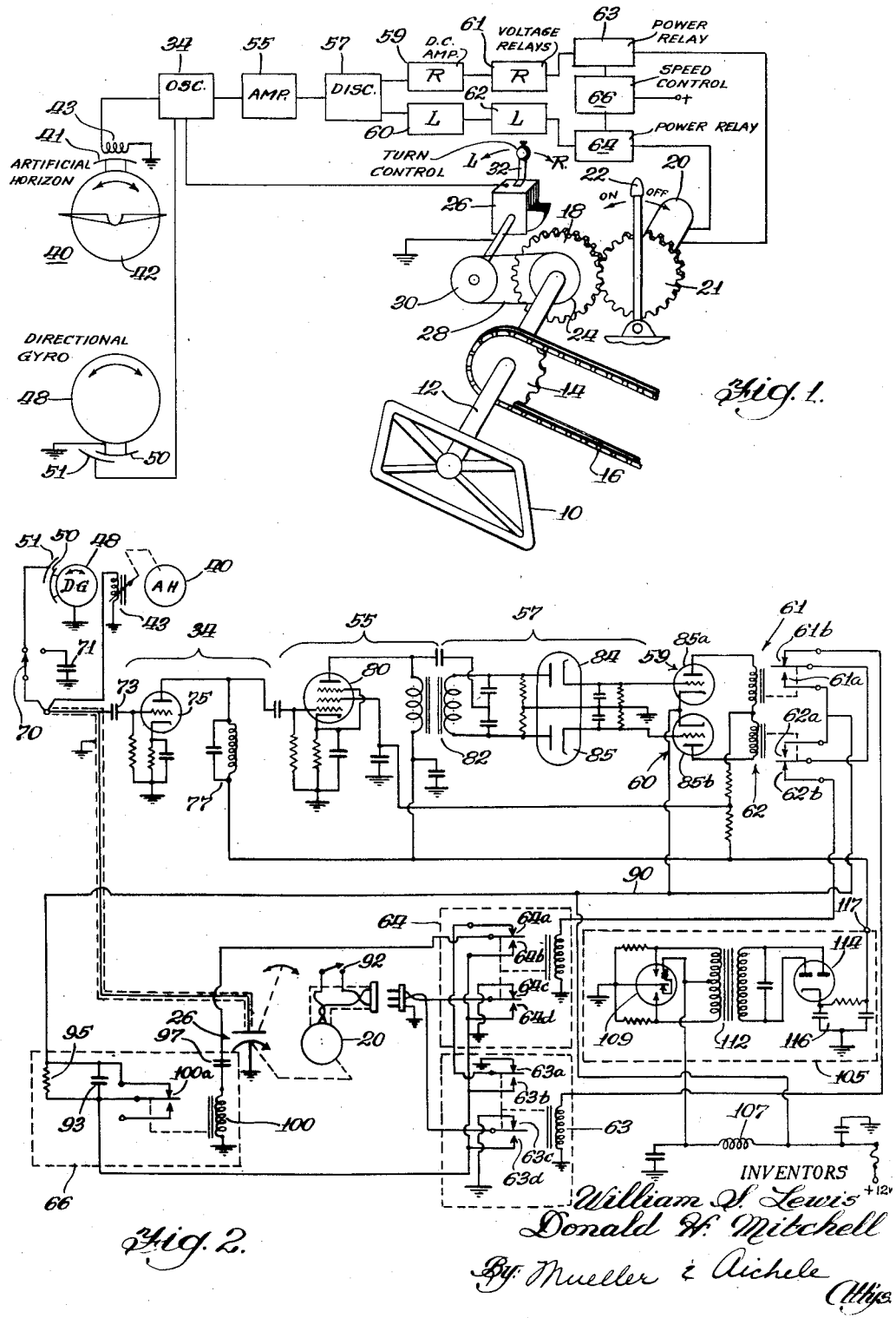
Fig. 1 is a block diagram illustrating the invention.
Fig. 2 is a schematic diagram of the electronic circuit of the invention.

This invention provides automatic steering apparatus for an airplane wherein the control shaft of the plane is operated by an electric control system responding to indications from the artificial horizon and/or directional gyro instruments of the plane. The system utilizes an electric control signal which is of reference or normal center frequency but which varries with changing conditions of the plane. A variable inductor may be coupled to the artificial horizon and a variable capacitor may be coupled to the directional gyro and these variable elements may be provided in the frequency determining circuit of an oscillator to provide the variable frequency control signal. The control is provided by a discriminator which converts the variable frequency to direct currents of either polarity depending on the frequency, and a reversible electric motor energized through the direct currents, which motor operates the control shaft. The motor may be cam mounted to selectively engage the wheel controlled column of the plane to operate the ailerons. The motor mechanism may be disengaged when not in use but it may also be overridden by the pilot even when engaged by means of a friction clutch in the mechanism coupling the motor to the steering column. Power is applied to the motor through a relay control system including a capacitor-relay vibrator circuit to initially apply full voltage to the motor, then reduced but increasing voltage for one to one and one half seconds followed by full voltage again. This provides quick starting of the motor but slow correction of the plane's position for small deviations of flight, that is, when the motor is energized for a short time, but full speed of the motor after the time delay for correction of larger course deviations.

The variable inductor in the artificial horizon indicating instrument for controlling the oscillator frequency may include a stationary coil and an inductance influencing plate movable past the coil to change the inductance in accordance with level changes of the plane. The variable capacitor in the directional gyro indicating instrument which is responsive to course changes of the plane may include stationary and movable plates so that the capacity varies with indications of the instrument. A followup condenser is mechanically coupled to the steering shaft of the plane and electrically coupled to the oscillator so that as the motor drives the plane back to its course in response to a frequency change by the artificial horizon or directional gyro, the followup condenser re-establishes the oscillator frequency and thereby de-energizes the motor. It may be appreciated that once the plane has been controlled and the controlling instruments return to positions indicating flight on a desired course, the system operates again to turn the control wheel of the plane back to maintain the course which has thereby been re-established and to restore the followup condenser to its prior capacity. It is also possible to provide fixed changes in the capacity of the followup capacitor to maintain a constant deviation from the course dictated by the instrument settings, for example, to effect a turn or to compensate for course deviation of the plane by an unbalanced weight therein.

Referring now to Fig. 1 there is shown diagrammatically the control system of the present invention. The control wheel 10 is secured to the shaft 12 so that rotation thereof turns the sprocket 14 which is connected through chain 16 to the ailerons of the plane. The wheel 10 may also move toward and away from a pilot of the plane in order to provide upward and downward movement thereof by suitable apparatus not shown. As is familiar to those in the art, many planes which are travelling on a selected course at a given altitude are controlled for the most part by mere rotation of wheel 10 in order to maintain the plane level and heading in the desired direction.

Gear 18 is also secured to shaft 12 and the reversible electric motor 20 is adapted to drive gear 21 which meshes with gear 18 upon movement to the left of lever 22. Accordingly, operation of the motor in either direction will effect steering and level controlling of the plane. Pulley 24 is also secured to shaft 12 so that the rotor of variable condenser 26 may be driven in accordance with rotation of pulley 24 through cord 28, or some other suitable means interconnecting pulley 24 with pulley 30 secured to the rotor shaft of condenser 26. Condenser 26 which may be termed a followup condenser has stationary plates which may be shifted with respect to the rotary plates by moving turn control lever 32. Condenser 26 is coupled to the oscillator circuit 34 so as to regulate the frequency of a signal produced by this circuit.

Instrument 40 constitutes a level or artificial horizon indicating instrument normally provided in a plane so that the pilot may determine when the plane is level or has rotated about an axis through the body thereof. A movable portion 42 of instrument 40 carries an inductance-capacity influencing plate 41 which passes in the vicinity of inductance coil 43 as the instrument indicates orientation of the plane. Coil 43 is connected to oscillator circuit 34 as a portion of the frequency determining circuit thereof.

Instrument 48 constitutes a directional gyro indicating instrument also normally provided in a plane. This may be set by the pilot once the plane is on course to thereafter indicate a deviation from this selected course. A movable portion of this instrument carries condenser plate 50 which moves in the vicinity of stationary condenser plate 51 as instrument 48 indicates deviation from a selected course. Plates 50 and 51 constitute a variable condenser which is also connected to the frequency determining circuit of oscillator circuit 34.

The output control signal of oscillator circuit 34 is therefore of a standard frequency associated with given orientation of the plane but is variable from the standard by the condenser 26, the inductor 43 and the condenser 50, 51. This signal is applied to the amplifier circuit 55 and then to discriminator circuit 57 which develops an output signal of one polarity if the signal from circuit 34 increases in frequency and a signal of the opposite polarity if the frequency of this signal decreases. Direct current amplifier circuits 59 and 60 are coupled to the discriminator circuits 57 in such a manner that one of these circuits will be energized when the discriminator circuit 57 produces a signal of one polarity while the other amplifier circuit will be energized when the polarity of the applied signal is reversed. Sensitive voltage relays 61 and 62 are connected respectively to amplifier circuits 59 and 60 and are responsive to energization of these amplifier circuits. Relays 61 and 62 are also connected respectively to power relays 63 and 64 respectively and these power relays are rendered operative when their associated relays 61 and 62 are operated. A speed control circuit 66 is connected between a source of positive potential and the reversible motor 20 through contacts of relays 63 and 64. Circuit 66, which will be explained in greater detail subsequently, is adapted to provide through either relay 63 or relay 64 an initial surge of voltage to motor 20 followed by reduced voltage for a selected period of time which is then followed by full voltage.

With the system just described in operative condition and the plane travelling a selected course, the following explanation is given assuming that due to some air current or the like the right wing dips. As instrument 40 indicates the lowering of the right wing it may be assumed that the inductance of coil 43 increases thus lowering the frequency of the signal produced by oscillator circuit 34. This causes discriminator circuit 57 to produce a signal to which D. C. amplifier 60 is responsive, relays 62 and 64 will be energized to apply the operating potential to motor 20 causing clockwise rotation of gear 21 and counterclockwise rotation of shaft 12 to turn this shaft in a direction to raise the right wing and lower the left wing. However, as shaft 12 is turned, pulley 30 will be rotated in a counterclockwise direction to decrease the capacity of followup condenser 26 thus tending to raise the frequency of the signal produced by circuit 34. Accordingly, the motor 20 will operate until the followup condenser 26 has been reduced in capacity sufficiently to compensate for the increased inductance of coil 43 caused by the lowering of the right wing, at which time motor 20 will be de-energized. For a given amount of dip in the wing, there is a definite change in the inductance of coil 43 and therefore of the frequency generated by oscillator circuit 34. This change in frequency is a measure of displacement of the wing from the desired orientation thereof. That is, a 10° dip of the right wing may decrease the frequency of the signal generated by circuit 34 by .2 megacycle and a 20° wing dip may decrease this frequency by .4 megacycle. A change in oscillator frequency causes the control shaft 12 to be rotated so that follow-up condenser 26 will be positioned to compensate for the shift in oscillator frequency thereby returning the signal to the standard frequency. After the control shaft 12 has been rotated in a counterclockwise direction, to return the oscillator signal to standard frequency, the control wheel 10 is, of course, in a turned position so that the plane will commence recovery toward level flight. As this operation occurs, instrument 40 will follow the changing orientation of the plane thus decreasing the inductance of coil 43 so that motor 20 will be energized to drive control shaft 12 in a clockwise direction thus causing followup condenser 26 to be increased in capacity so that as the plane arrives at a level flight condition, condenser 26 has been returned to its original position and wheel 12 and the ailerons of the plane are in a normal or neutral condition with the plane in level flight.

In a corresponding manner if the heading of the plane is shifted to the right of the course the capacity between plates 50 and 51 will be increased to lower the frequency of the signal produced by circuit 34 to energize relay 62 and 64 thus dipping the left wing which will return the plane to its original direction after which the system will operate to again level the wings. It should also be apparent that by locking instrument 48 in fixed position and moving lever 32 to the left, the capacity of condenser 26 may be increased to lower the signal frequency of oscillator circuit 34 and cause operation of relays 62 and 64 to turn the plane to the left until the signal has been brought back to its original frequency by reduction of the inductance of coil 43 at which time the motor will stop and the plane will be maintained in this newly orientated position. Thus it is possible to compensate for an unbalanced load in the plane or precession of instrument 40 by setting lever 32 to introduce a constant shift of the frequency of the oscillator signal associated with the desired orientation of the plane.

Fig. 2 illustrates schematically the electronic control circuit used to energize the reversible motor 20. A switch 70 is connected in one lead from the capacitor formed by plates 50 and 51 in the directional gyro instrument 48 in order to substitute a fixed capacitor 71 in place of the capacitor formed by plate 50 and 51. It would be desirable to substitute such a fixed capacity, for example, in making a bank turn by operation of lever 32, that is, when it is desired to deviate from the course which the directional gyro instrument 48 would tend to maintain.

It may be noted that capacitor 26, the capacitor formed by plates 50, 51 and coil 43 are all coupled through capacitor 73 to the grid of oscillator tube 75. The plate of tube 75 is connected to the tuned circuit 77 which is resonant at a selected frequency which is to be associated with the desired orientation of the plane when being operated by the automatic system. It has been found that a frequency of 11.5 megacycles provides satisfactory operation of the system and desirable sensitivity of response by the discriminator circuit 57. The signal from oscillator circuit 34 is applied to amplifier tube 80 in the amplifier circuit 55 in order to be increased in amplitude in a known manner. The signal is then coupled through discriminator transformer 82 and applied to the anodes of a pair of diode sections 84, 85 in the discriminator 57. The output from discriminator circuit 57 is applied to the grids of tubes 85a and 85b which are associated respectively with D. C. amplifier circuits 59 and 60. The anodes of tubes 85a and 85b respectively control the energization of relays 61 and 62. It may be seen that if the signal applied to the discriminator circuit 57 is at 11.5 megacycles there will be a balanced output applied to amplifiers 59 and 60 causing energization of both relays 61 and 62 and establishing contacts 61a and 62a associated with these relays.

Assuming now that the frequency applied to circuit 57 is below 11.5 megacycles due to a shift in oscillator signal frequency as previously described tube 85a remains conducting and tube 85b is cut off. It may be also noted that the positive potential source is applied to lead 90 which is connected to the cathodes of tubes 85a and 85b as a bias therefor so that a lesser change in input to tube 85b may cause cutoff thereof. The positive potential on lead 90 may be the order of 12 volts such as used in some aircraft electrical systems. Accordingly, with the de-energization of relay 62 contacts 62b thereof will be established to apply the positive potential through contacts 61a and 62b to energize relay 64. It should also be pointed out that at this time relay 63 remains de-energized and that relay 64 has been previously described as causing the operation of the motor in a direction to rotate wheel 10 and shaft 12 in a counterclockwise direction to lower the left wing and raise the right wing. Accordingly, ground will be applied to one lead of motor 20 through contacts 63c and switch 92 which is closed when the motor is mechanically coupled to the control shaft of the plane. Furthermore, the positive potential will be applied from lead 90 through contacts 100a of unenergized relay 100 and contacts 64d to the other lead for the motor.

The components 93, 95, 97 and 100 comprise the speed control circuit 66. It may be seen that with contacts 100a closed the full value of the positive potential will be applied to motor 20 causing it to begin operation at full torque, while at the same time the potential will be applied to relay 100 through capacitor 97 and contacts 64b energizing relay 100 and opening contacts 100a. It should be apparent that as capacitor 97 begins to charge through the winding of relay 100 it will cause energization of this relay and opening of contacts 100a. Accordingly, the current for motor 20 and the charge current for capacitor 97 will now flow through resistor 95 thus reducing the voltage applied to the motor and the speed developed thereby while at the same time decreasing the charging current of capacitor 97 so that relay 100 is de-energized. At this time contacts 100a will be closed which contacts short resistor 95 and again apply the full potential to motor 20 and the series combination of the winding of relay 100 and capacitor 97. Accordingly capacitor 97 will accumulate a further charge by drawing current through the winding of relay 100 which will open contacts 100a and again reduce the voltage applied to the motor and this relay. This process will be repeated until the charge current of capacitor 97 no longer is sufficient to energize relay 100 at which time contacts 100a will remain closed and the full potential will be applied to the motor which then operates at full speed. In the preferred form of the invention the constants of speed control circuit 66 are chosen so that capacitor 97 takes approximately one to one and a half seconds before its charging curent is no longer sufficient to operate relay 100. It may be seen that as capacitor 97 continues to charge relay 100 will be energized for decreasing amounts of time so that the speed control circuit 66 regulates the application of power to motor 20 and the speed thereof slowly builds up to maximum after the lapse of one to one and a half seconds. However, it may also be seen that initially the full potential is applied to motor 20 so that for the first instant before relay 100 has been energized at all the full voltage will be applied to the motor in order to best begin operation of shaft 12.

The purpose of the speed control circuit 66 is to correct small deviations from the desired course at low motor torque so as to lessen the possibility of overshooting or overcontrolling but to provide a more rapid return to the desired plane orientation when there has been a comparatively large deviation from course and the motor must operate for a longer period of time to correct this condition. In the case of large corrections it is deemed preferable to permit slight over correction, caused for example by inertia of turning the plane, in order to obtain a more rapid correction of the plane's orientation. The system does however, include circuitry for braking the motor 20 when the power is removed so that it will respond rapidly and precisely at such time. Such braking of motor 20 is obtained through use of a low inertia armature and a permanent magnetic field in which it turns so that short circuiting of the armature winding through contacts 63c and 64c as soon as the power is removed from the motor stops motor rotation. Thus when relays 63 and 64 are de-energized the motor is short circuited thus braking the armature to substantially an instant stop.

The detailed explanation above has been in connection with a counterclockwise rotation of shaft 12 and wheel 10 to effect lowering of the left wing and raising of the right wing of the plane for which operation tube 85b is cut off and relay 62 is de-energized while tube 85a remains conducting and relay 61 remains energized. However, if the oscillator frequency should increase due to a change in the indications of instruments 40 or 48 or a change in the setting of lever 32, tube 85a would be cut off while tube 85b would remain conducting thus maintaining relay 62 energized and de-energizing relay 61. Thus, the potential on line 90 would be applied through contacts 62a and 61b to energize relay 63. Accordingly, the ground return would be applied to motor 20 through contacts 64c and the potential of line 90 would be applied to the other motor lead through contacts 100a contacts 63d and switch 92 which is closed when motor 20 is in position to drive gear 18. It may be noted that the potential is applied to motor 20 in opposite polarity to that applied when relay 64 is energized so that the motor will now turn in the opposite direction. Furthermore, it should be obvious that the same speed control action will take place as described above in connection with energization of relay 64 with the charging current for capacitor 97 being supplied through contacts 64a and 63b. Accordingly, the motor will be driven in a direction to turn shaft 12 and wheel 10 in clockwise rotation to raise the left wing and lower the right wing as motor 20 is slowly brought up to full speed in one to one and a half seconds as previously explained.

The electronic control circuit also includes a power supply unit 105 to which the positive potential is applied through choke 107 and which includes a vibrator unit 109, power transformer 112, and rectifier tube 114 connected in a circuit familiar to those in the art which converts the potential on line 90 to a direct current potential of the order of 250 volts suitable for operating the various stages of the control circuit. A filter circuit 116 is also provided between tube 114 and the terminal 117 at which appears the high voltage direct current.

Turning now to Figs. 3 and 4 the mechanism associated with motor 20 will be explained. The motor 20 is mounted on the frame 125 by means of a yoke 127 through which an axle 129 passes. The axle 129 is eccentrically mounted in support portions 131, 132 which are integral with the frame 125. Lever 22 is also secured to axle 129 so that movement of lever 22 to the right in Fig. 4 causes movement of motor 20 upwardly and to the right.

The motor may also include suitable gear reducing mechanism so that bevel gear 21 rotates at a speed of the order of 16 revolutions per minute. Gear 21 is driven through friction clutch mechanism 135 and spring 137 tends to maintain the clutch mechanism in an engaged or power transferring condition. Accordingly when lever 22 is moved to the left, as shown in Fig. 4, gear 21 engages gear 18 so that rotatable member 140 is driven in order to drive steering shaft 12 of the plane through suitable connector pins between member 140 and shaft 12. In a constructed model a 2:1 speed reduction between gears 21 and 18 was found to provide satisfactory operation. With the friction clutch as shown, if there is a sudden torque applied to shaft 12, clutch mechanism 135 may slip in order to override the motor driven mechanism even when gears 18, 21 are engaged. Thus if the plane should shift suddenly and widely off course the pilot could merely operate wheel 10 (Fig. 1) to quickly make the necessary correction. The clutch mechanism would also lessen the strain on the ailerons if the plane were suddenly shifted from course and chain 16 transmitted any force on the ailerons to shaft 12.

Switch 92 is also secured to yoke structure 127 and a projecting portion of this switch engages a peg member 144 secured to bracket 146 which is mounted on the frame 125. Accordingly, when lever 22 is moved to the left (Fig. 4) to operatively connect the motor to shaft 12 switch 92 is closed in order to permit energization of the motor in accordance with the control explained in connection with Fig. 2. Thus the motor will not be operated when it is disengaged from the control shaft even though the electronic circuit remains energized. An adjustable stop peg 148 is also provided for use in fixing the position of the motor when moved to the disengaged position.

Pulley 24 is mounted to rotate with gear 18 and cord 28 is strung between this pulley and pulley 30 which is mounted on the shaft of variable capacitor 26. Accordingly, as shaft 12 is driven by the mechanism, the rotor of capacitor 26 will be driven also. It may be desirable in some instances to adjust the relation between the change in plane orientation produced by rotation of shaft 12 and the amount of change in capacity of capacitor 26 for that rotation of shaft 12 so that capacitor 26 restores the oscillator frequency and thus stops motor 20 before the plane is totally corrected so that wing inertia will not overcorrect the plane. Capacitor 26 is mounted in a cylindrical container 150 which is rotatable with respect to frame 125 by movement of lever 32. Accordingly, a pilot may, by movement of lever 32, change the position of the stator plates of capacitor 126 by rotation of container 150 thus changing the capacity of followup capacitor 26 without rotating the shaft thereof. A suitable trimming capacitor 26a may be provided and connected across capacitor 26 so that the position of lever 32 will be in a convenient location when the plane is on course. As previously pointed out a turn may be made by moving lever 32 and it is possible to provide an indication for the position of this lever so that movement thereof by a given amount for a given period of time will effect a predetermined turn of the plane. For example, moving lever 32 to the right in Fig. 4 by a given amount could change the capacity of followup capacitor 26 by the proper amount to cause the plane to turn 180° in the time of one minute. Therefore, a pilot could make such a turn in blind flying conditions by merely moving lever 32 and timing the operation for 60 seconds. As previously explained, slight corrections for unbalanced load of the plane may also be made by setting of lever 32, for example, if one wing is heavy due to the condition of the gas tanks or if there is an unbalanced load in the fuselage of the plane. Electrical connection is made to capacitor 26 by means of jack 155 and the necessary electrical connection is made to the motor by means of the receptacle 157.

Figure 9:
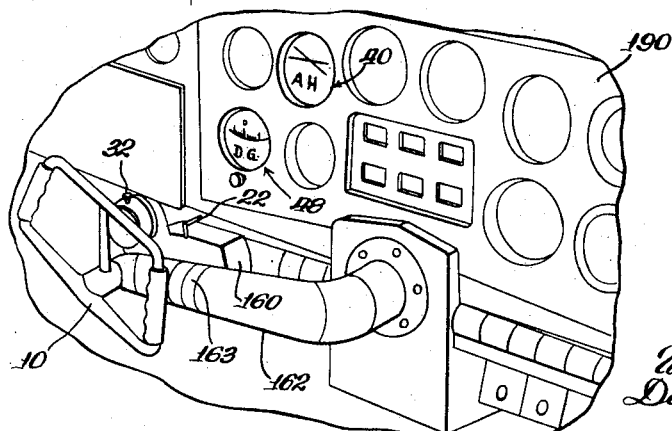
Fig. 9 is a perspective view of a portion of the cockpit of a plane illustrating the control apparatus installed therein.

Fig. 9 illustrates the complete mechanicl control unit as installed in a plane. It may be seen that the mechanism is enclosed in a housing 160 which is fastened to the arm 162 in the plane by means of encircling straps 163. Thus levers 22 and 32 are conveniently available to the pilot and the entire mechanism may move backward and forward as the plane is nosed up or down. Only a single mechanical connection is necessary to the shaft which control wheel 10 drives and an electrical connection by a pair of electrical cables to jack 155 and receptacle 157 (Fig. 3) completes the installation as shown in Fig. 9.

Figure 5:
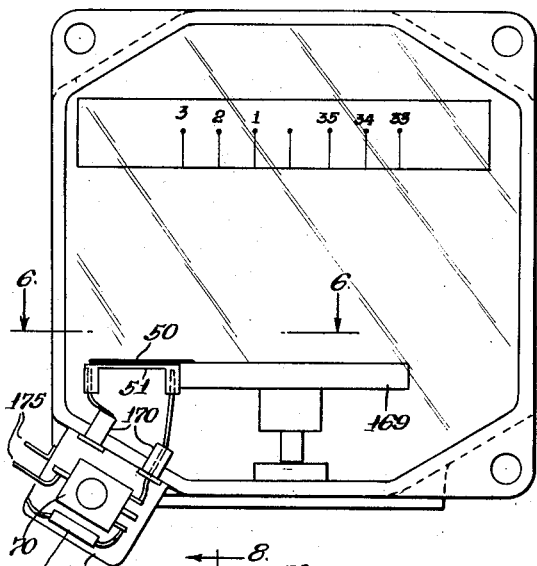
Figs. 5 and 6 illustrate modifications of a directional gyro indicating instrument in accordance with the invention.
Figure 6:
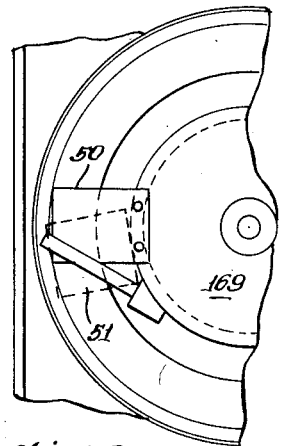

Figs. 5 and 6 illustrate the necessary modification of a directional gyro instrument 48 shown generally in Fig. 1. In this instrument the electrically conductive plate 50 is secured to the rotatable member 169 which rotates as the plane moves to the right or left of its established course. A stationary plate 51 is mounted by means of insulators 170 and switch 70 is mounted on the outside of instrument 48 and enclosed in a suitable housing 173. Fixed capacitor 71 is also included in housing 173 and as explained in connection with Fig. 1 switch 70 permits either the connection of capacitor 71 or the capacitor formed by plates 50, 51 across the output leads 175 which are coupled between capacitor 73 and ground. Plate 50 may be of light weight metallic material so as to have a minimum effect on the normal operation of the instrument 48 and as shown in Fig. 6 is positioned above plate 51 in the zero or on course indication of the directional gyro so that the capacity increases as the instrument moves in one direction and the capacity decreases as the instrument moves in the other direction.

Figure 7:
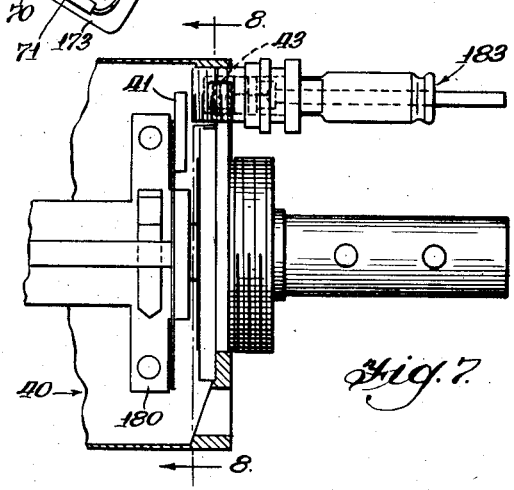
Figs. 7 and 8 illustrate modifications of an artificial horizon indicating instrument in accordance with the invention.
Figure 8:
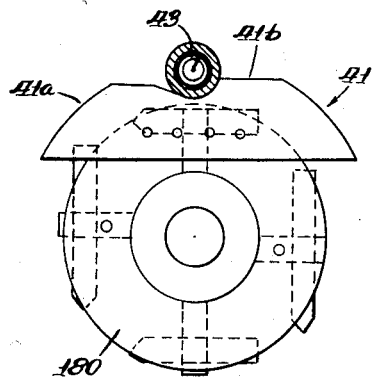

Figs. 7 and 8 show the modification of the artificial horizon indicating instrument 40 in order to provide a changed inductance as the instrument indicates different readings. The plate 41 consists of an aluminum portion 41A of high electrical conductivity and an iron portion 41B of high permeability which are secured to the movable member 189 as shown in Fig. 8. The inductance coil 43 is mounted on the frame of instrument 40 in a position approximately adjacent the junction between the plate portions 41A and 41B when the movable member 180 is in the position which it assumes when the plane is level. Thus it may be seen that as member 180 rotates counterclockwise in Fig. 8, the iron portion 41B of plate 41 will be positioned adjacent the coil tending to increase its inductance and as the member 180 rotates in a clockwise direction plate portion 41A will be positioned by the coil tending to reduce its inductance. Portions 41A and 41B may be suitably shaped to provide gradually decreased and increased inductance in coil 43 as member 180 rotates by greater amounts in clockwise and counterclockwise directions respectively. A coupling 183 is mounted on the case of instrument 40 to provide convenient electrical connection to coil 43. Plate 41 may be formed of thin light weight portions in order to have a minimum influence upon the normal operation of the instrument 40 and it may be seen that the modification of both instruments 40 and 48 are comparatively simple and that the modifications will have little or no adverse effect on the normal operation of these instruments.

The electronic control apparatus illustrated in Fig. 2 may be housed in a suitable box and installed in a desired position with respect to the center of gravity of the plane or behind the panel 190 shown in Fig. 9. It should be apparent to those skilled in the art that the described orientation control apparatus would be comparatively light in weight and would not require high current from the plane's electrical system so that increased capacity of the normal system need not be provided. Therefore, the entire apparatus will be simple to install in a plane and readily accessible for servicing should such be necessary. This automatic piloting apparatus includes a desirable override feature so that the pilot may at any time assume control of the plane even when the automatic apparatus is in the process of controlling the plane. Furthermore, the apparatus may be simply disengaged from the control shaft so that there is no drag on the plane's controls when the mechanism is not in use. The control circuit includes a provision for strong and rapid correction of large deviations of the plane from its course as well as gentle correction of the orientation of the plane following small deviations from the desired course. The apparatus will maintain a course determined in accordance with settings of the directional gyro of the plane and/or the artificial horizon instrument thereof which determines the frequency change in a signal generated by an oscillator the normal frequency of which is associated with an "on course" condition of the plane and the changed frequency of which operates a motor to alter orientation of the plane. A followup provision is also included so that the plane is automatically turned until back on course and then re-turned to maintain that course. The system further includes a simple control in the form of lever 32 to provide a selected deviation from the course determined by the instruments. Therefore, the orientation controlling apparatus of this invention provides a highly satisfactory and practical system for operation of an airplane in flight.

We claim:

1. Automatic control apparatus for an airplane having a steering column adapted to be turned to control the airplane, said apparatus including in combination, reversible electric motor means, means coupling said motor means to the steering column, a wave signal oscillator including first, second and third frequency controlling portions for increasing and decreasing the frequency of a control signal normally of reference frequency produced by the oscillator, the signal of reference frequency being associated with selected level and heading orientation of the airplane, said first frequency controlling portion being variable with rotation of the steering column, a level indicator for the plane including a movable portion, means connecting said second frequency controlling portion to said movable portion for changing the frequency of said oscillator in response to change in level conditions of the plane, a directional indicator for the plane including a movable portion, means connecting said third frequency controlling portion of said oscillator to said movable portion of said directional indicator for changing the frequency of said oscillator in response to changes in direction of the plane, discriminator and control means coupled to said motor means for energizing the same to turn the steering column in respective directions determined by increase and decrease in the frequency of said control signal, the changes in frequency of said control signal with respective changes in level condition and directional heading of the plane being correlated to cause the steering column to be driven by said motor to maintain said selected level and heading orientation of the airplane.

2. Automatic aileron control apparatus for an airplane having a steering column adapted to control the level condition of the airplane, said control apparatus including in combination, reversible electric motor means coupled to the steering column for turning the same, wave signal oscillator means, a followup capacitor variable with rotation of the steering column, a level indicator for the plane including a rotatable portion carrying an inductance influencing portion comprising a section of high permeability and a section of high electrical conductivity and inductor means mounted adjacent said inductance influencing portion and adapted to be increased and decreased in value by opposing changes in level condition of the plane as said rotatable portion carries said inductance influencing portion past said inductor means, said inductance influencing portion being shaped to provide gradual change in the value of said inductor means as said rotatable portion functions, said capacitor and said inductor means being coupled to said oscillator means and comprising tuned circuit means therefor to determine the production of a signal of reference frequency thereby which is associated with a selected level condition of the plane, discriminator means coupled to said oscillator means and adapted to produce first and second control signals as the frequency of a signal produced thereby increases and decreases respectively, and control means coupled to said discriminator means for energizing said reversible electric motor means to cause rotation thereof in respective directions determined by production of said first and second control signals, the changes in said capacitor and said inductor means with respective changes in rotation of the steering column and rotation of the plane being correlated with said oscillator means and control means to cause the steering column to be driven by said motor to tend to maintain the production of the signal of reference frequency and said selected level condition.

3. Automatic aileron controlling apparatus for an airplane having a steering column adapted to be turned to control the ailerons, said apparatus including in combination, a reversible electric motor coupled to the steering column to drive the same, wave signal oscillator means, a followup capacitor variable with rotation of the steering column, a level indicator for the plane including a rotatable portion carrying a bimetallic inductance influencing portion and inductor means mounted adjacent said inductance influencing portion and adapted to be increased and decreased in value by opposing changes in level condition of the plane as said rotatable portion carries said inductance influencing portion past said inductor means, a directional indicator for the plane including a rotatable portion carrying a movable condenser plate and a fixed condenser plate secured adjacent the aforementioned condenser plate forming a variable capacitor having a value adapted to be increased and decreased by opposing changes in direction of the plane as said movable plate varies with respect to said fixed plate, said followup capacitor, said inductor means and said variable capacitor all being coupled to said oscillator means and comprising tuned circuit means therefor to determine the production of a signal of reference frequency thereby which is associated with selected level and heading orientation of the plane, discriminator means coupled to said oscillator means and adapted to produce first and second control signals as the frequency of a signal produced thereby increases and decreases respectively, and control means coupled to said discriminator means for energizing said reversible electric motor to cause rotation thereof in directions determined by production of said first and second control signals, the changes in said followup capacitor, said inductor means and said variable capacitor with respective changes in rotation of the steering column and rotation and direction of the plane being correlated with said oscillator means and control means to cause the steering column to be driven by said motor to tend to maintain the production of the signal of reference frequency and said selected level and heading orientation, and means for rendering change in heading of the plane of no influence on the frequency of the signal produced by said oscillator means so that only the condition of said level indicator causes control of the airplane.

4. Automatic orientation control apparatus for a vehicle having a steering column adapted to control the orientation of the vehicle, said control apparatus including in combination, a reversible electric motor coupled to the steering column for turning the same, indicating means having a portion movable with change in the orientation of the vehicle, oscillator means for producing a control signal of standard frequency associated with given orientation of the vehicle and including variable reactance means coupled to the movable portion of said indicating means and adapted to change the frequency of the control signal produced by said oscillator means in accordance with movement of the movable portion of said indicating means, frequency responsive control means coupled to said oscillator means and said electric motor for energizing said motor according to the frequency of the control signal as varied by said reactance means thereby controlling the steering column in accordance with the position of the movable portion of said indicating means, and followup capacitor means coupled to said oscillator means to vary the frequency of a signal produced thereby, said followup capacitor means being variable with turning of the steering column to return the frequency of the control signal to said standard frequency when the steering column is turned and being manually adjustable to effect a change in the frequency of the control signal to operate said electric motor and provide orientation control of the vehicle manually.

5. Automatic orientation control apparatus for an airplane having a steering column adapted to control the orientation of the airplane, said control apparatus including in combination, reversible electric driving means, manually disengageable means coupling said driving means to the steering column to permit disabling said controlling apparatus, said disengageable means including a friction clutch coupling the same to said driving means to provide limited torque transference between said driving means and the steering column to permit override of said driving means, indicating means having a portion movable with change in the orientation of the plane, oscillator means for producing a control signal of standard frequency associated with given orientation of the plane and including variable reactance means coupled to the movable portion of said indicating means and adapted to change the frequency of the control signal produced by said oscillator means in accordance with movement of the movable portion of said indicating means, frequency responsive control means coupled to said oscillator means and said electric driving means for energizing said driving means according to the frequency of the control signal as varied by said reactance means thereby controlling the steering column in accordance with the position of the movable portion of said indicating means, and followup capacitor means coupled to said oscillator means and variable with control of the steering column to return the frequency of the control signal to said standard frequency when the steering column is turned.

6. Automatic orientation control apparatus for an airplane having a steering column adapted to control the orientation of the airplane, said control apparatus including in combination, first gear means coupled to the steering column, second gear means supported by eccentric mounting means and adapted to be manually engageable and disengageable with said first gear means for disabling said control apparatus, reversible electric driving means coupled to said second gear means, indicating means having a portion movable with change in the orientation of the plane, oscillator means for producing a control signal of standard frequency associated with given orientation of the plane and including variable reactance means coupled to the movable portion of said indicating means and adapted to change the frequency of the control signal produced by said oscillator means in accordance with movement of the movable portion of said indicating means, frequency responsive control means coupled to said oscillator means and said electric driving means for energizing said driving means according to the frequency of the control signal as varied by said reactance means thereby controlling the steering column in accordance with the position of the movable portion of said indicating means, and followup capacitor means coupled to said wave signal producing means and variable with control of the steering column to return the frequency of the control signal to said standard frequency when the steering column is turned.

7. Automatic orientation control apparatus for an airplane having a steering column adapted to control the orientation of the airplane, said control apparatus including in combination, reversible electric driving means, friction clutch means coupling the steering column to said driving means to provide limited torque transference between said driving means and the steering column to permit override of said driving means by turning of the steering column, indicating means having a portion movable with change in the orientation of the plane, oscillator means for producing a control signal of standard frequency associated with given orientation of the plane and including variable reactance means coupled to the movable portion of said indicating means and adapted to change the frequency of the control signal produced by said oscillator means in accordance with movement of the movable portion of said indicating means, frequency responsive control means coupled to said oscillator means and said electric driving means for energizing said driving means according to the frequency of the control signal as varied by said reactance means thereby controlling the steering column in accordance with the position of the movable portion of said indicating means, and followup capacitor means coupled to said wave signal producing means and variable with control of the steering column to return the frequency of the control signal to said standard frequency when the steering column is turned.

8. Automatic orientation control apparatus for an airplane having a steering column adapted to control the orientation of the airplane, said control apparatus including in combination, reversible electric driving means coupled to the steering column for driving the same, indicating means having a portion movable with change in the orientation of the plane, oscillator means for producing a control signal of standard frequency associated with given orientation of the plane and including variable reactance means coupled to the movable portion of said indicating means and adapted to increase and decrease the frequency of the control signal produced by said oscillator means in accordance with movements of the movable portion of said indicating means, followup capacitor means coupled to said oscillator means and variable with control of the steering column to return the frequency of the control signal to said standard frequency when the steering column is turned, discriminator means coupled to said oscillator means and adapted to produce first and second control signals as the frequency of the control signal produced by said oscillator means increases and decreases respectively, and timing and voltage control mean coupled to said discriminator means for energizing said driving means to produce slow operation thereof for a given period followed by faster operation in response to said first and second control signals, whereby said apparatus controls the steering column in accordance with the position of the movable portion of said indicating means.

9. Automatic orientation control apparatus for an airplane having a steering column adapted to control the orientation of the airplane, said control apparatus including in combination, reversible electric driving means engagable with the steering column for driving the same, indicating means having a portion movable with change in the orientation of the plane, oscillator means for producing a control signal of standard frequency associated with given orientation of the plane and including variable reactance means coupled to the movable portion of said indicating means and adapted to change the frequency of the control signal produced by said oscillator means in accordance with change in orientation of the plane, followup capacitor means coupled to said oscillator means and variable with control of the steering column to return the frequency of the control signal to said standard frequency when the steering column is turned, frequency responsive control means coupled to said oscillator means and responsive to change in frequency of said control signal to energize said driving means to produce slow operation thereof for a given period followed by faster operation thereof, said control means including charging capacitor means and relay means having an energizable winding and operable contacts series coupled through said charging capacitor means to provide vibrator action of said contacts for said given period in response to change in frequency of said control signal, said relay means being adapted to energize said driving means for slow operation when vibrating and to energize said driving means for faster operation thereafter, whereby said orientation controlling apparatus controls the steering column by slow and rapid action in accordance with the position of the movable portion of said indicating means and the amount of deviation from said given orientation of the plane.

10. Automatic orientation control apparatus for an airplane having a steering column adapted to control the orientation of the airplane, said control apparatus including in combination, reversible electric driving means engagable with the steering column for driving the same, indicating means having a portion movable with change in the orientation of the plane, oscillator means for producing a control signal of standard frequency associated with given orientation of the plane and including variable reactance means coupled to the movable portion of said indicating means and adapted to increase and decrease the frequency of the control signal produced by said oscillator means in accordance with movements of the movable portion of said indicating means, followup capacitor means coupled to said oscillator means and variable with control of the steering column to return the frequency of the control signal to said standard frequency when the steering column is turned, discriminator means coupled to said oscillator means and adapted to produce first and second control signals as the frequency of the control signal produced by said oscillator means increases and decreases respectively, and control means coupled to said discriminator means for energizing said driving means to produce slow operation thereof for a given period commensurate with operation of said driving means to correct small deviations from said given orientation followed by faster operation thereof for correcting large deviations from said given orientation, said control means including charging capacitor means and relay means having an energizable winding and operable contact means series coupled through said charging capacitor means to provide vibrator action of said contact means for said given period in response to said first and second control signals, said control means further including impedance means coupled through said contact means to said driving means to energize the same through said impedance means for slow operation when vibrating and to energize said driving means for faster operation thereafter, whereby said apparatus controls the steering column by slow and rapid action in accordance with the position of the movable portion of said indicating means and the amount of deviation from said given orientation of the plane.

11. Automatic aileron controlling apparatus for an airplane having a steering column adapted to be turned to control the ailerons, said apparatus including in combination, reversible electric motor means, disengageable means coupling said motor means to the steering column for disabling said controlling apparatus, said disengageable means including a friction clutch coupling the same to said motor means to provide limited torque transference between said motor means and the steering column for override of said motor means, wave signal oscillator means, a first capacitor variable with rotation of the steering column, a level indicator for the plane including a movable portion carrying an inductance influencing portion and inductor means mounted adjacent said inductance influencing portion and adapted to be increased and decreased in value by opposing changes in rotation of the plane, a directional indicator for the plane including a movable portion carrying a condenser plate and a further condenser plate fixably secured adjacent the aforementioned condenser plate forming a variable second capacitor having a value adapted to be increased and decreased by opposing changes in direction of the plane, said first capacitor, said inductor means and said second capacitor all being coupled to said oscillator means and comprising a tuned circuit means therefor to determine the production of a signal of reference frequency thereby which is associated with selected level and heading orientation of the plane, discriminator means coupled to said oscillator means and adapted to produce first and second control signals as the frequency of a signal produced thereby increases and decreases respectively, and control means coupled to said discriminator means for energizing said motor means to cause rotation thereof in respective directions determined by production of said first and second control signals to tend to maintain said selected level and heading orientation.

12. Automatic orientation controlling apparatus for an airplane having a steering column adapted to control the orientation of the plane, said apparatus including in combination, a first gear coupled to the steering column, a second gear engageable with said first gear and disengageable therefrom for disabling said control apparatus, a reversible electric motor, a friction clutch coupling said second gear to said electric motor to provide limited torque transference between said electric motor and the steering column, wave signal oscillator means, a first variable capacitor variable with rotation of the steering column, a first orientation indicator for the plane including a movable portion carrying an inductance influencing portion and inductor means mounted adjacent said inductance influencing portion and adapted to be increased and decreased in value by opposite changes in one type of orientation of the plane, a second orientation indicator for the plane including a movable portion carrying a condenser plate and a further condenser plate fixed adjacent the aforementioned condenser plate forming a second variable capacitor having a value adapted to be decreased and increased by opposite changes in another type of orientation of the plane, said first variable capacitor, said inductor means and said second variable capacitor all being coupled to said oscillator means and comprising tuned circuit means therefor to determine the frequency of a reference signal produced thereby which is associated with selected orientation of the plane, discriminator means coupled to said oscillator means and adapted to produce a first control signal as the frequency of a signal produced by said oscillator means increases and a second control signal as the frequency of a signal produced thereby decreases, and control means coupled to said discriminator means for energizing said reversible electric motor to cause rotation thereof in respective directions determined by production said first and second control signals, said control means including speed control means for energizing said motor to produce slow rotation for a given period followed by faster rotation, said first variable capacitor being adapted to increase in capacity as the steering column is driven in response to said first control signal and to decrease in capacity as said steering column is driven responsive to said second control signal thereby compensating said tuned circuit means as one of said orientation indicators changes in accordance with change in orientation of the plane and said electric motor is energized.

13. Automatic orientation control apparatus for an airplane having a steering column adapted to control the orientation of the airplane, said control apparatus including in combination, reversible electric driving means engageable with the steering column for driving the same, indicating means having a portion movable with change in the orientation of the plane, oscillator means for producing a control signal of standard frequency associated with given orientation of the plane and including first and second variable frequency controlling portions, said first frequency controlling portion being coupled to the movable portion of said indicating means and adapted to increase and decrease the frequency of the control signal produced by said oscillator means in accordance with movement of the movable portion of said indicating means, said second frequency controlling portion being coupled to the steering column to return the frequency of the control signal to said standard frequency when the steering column is turned, discriminator means coupled to said oscillator means and adapted to produce first and second control signals as the frequency of the control signal produced by said oscillator increases and decreases respectively, and timed voltage applying means coupled to said discriminator means for energizing said driving means to produce slow operation thereof for a predetermined period followed by faster operation in response to said first and second control signals, thereby controlling the steering column by slow operation followed by more rapid operation in accordance with the position of the movable portion of said indicating means, and the time duration to re-establish said standard frequency as related to the predetermined period.

14. Automatic orientation control apparatus for an airplane having a steering column adapted to control the orientation of the plane, said control apparatus including in combination, reversible electric motor means engageable with the steering column for driving the same, indicating means having a portion movable with change in orientation of the plane, oscillator means for producing a control signal of standard frequency associated with given orientation of the plane and including first and second variable frequency controlling portions, said first frequency controlling portion being coupled to the movable portion of said indicating means and adapted to increase and decrease the frequency of the control signal produced by said oscillator means in accordance with opposing movements of the movable portion of said indicating means, said second frequency controlling portion being coupled to the steering column to return the frequency of the control signal to the standard frequency when the steering column is turned, discriminator means coupled to said oscillator means, and power control means coupled to said discriminator means and said reversible electric motor means to cause operation thereof and driving of the steering column according to increase and decrease in the frequency of the control signal, said power control means including a circuit portion for electrically braking said reversible electric motor means when the control signal of standard frequency is produced so that orientation of the airplane is controlled by said indicating means and said electric motor means is subject to braking for precise control of the steering column.

15. Automatic control apparatus for regulating a control shaft in response to a change in setting of an indicator instrument, said control apparatus including in combination reversible electric driving means adapted to be coupled to the control shaft for turning the same, an oscillator circuit including tuned circuit means for establishing the frequency of a signal produced thereby, said tuned circuit means including variable reactance means adapted to be coupled to the indicator instrument and to be varied in accordance with the indication thereof whereby variation of the indicator instrument causes variation in the frequency of the signal, frequency responsive control means coupled to said oscillator and said driving means for energizing said driving means and turning the shaft in one direction as the frequency of the signal increases and in the opposite direction as such frequency decreases, and variable follow-up reactance means mechanically coupled to said driving means to be operated thereby, said follow-up reactance means being electrically coupled to said tuned circuit means and being related to said first mentioned reactance means to compensate for a change in the same and return the signal to a frequency associated with a given setting of the indicator instrument.

16. The control apparatus of claim 15 wherein said variable follow-up reactance means is manually variable for effecting operation of the control shaft through manipulation of said follow-up reactance means.

References Cited in the file of this patent

UNITED STATES PATENTS

| | | |
|---|---|---|
| 2,126,910 | Moseley | Aug. 16, 1938 |
| 2,429,771 | Roberts | Oct. 28, 1947 |
| 2,509,617 | Skillman | May 30, 1950 |